Patented May 19, 1931

1,806,047

UNITED STATES PATENT OFFICE

RICHARD DERESER AND KARL MOLDAENKE, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

WATER-INSOLUBLE AZO DYESTUFFS AND MATERIAL DYED THEREWITH

No Drawing. Application filed December 5, 1928, Serial No. 324,051, and in Germany December 17, 1927.

Our present invention relates to new water-insoluble azo dyestuffs and material dyed therewith.

We have found that dyestuffs of excellent fastness are obtained by coupling a diazo compound of a dihalogen-2-amino-1-toluene containing a halogen atom in 4: position and at least one bromine atom, with an arylamide of 2.3-hydroxy-naphthoic acid.

The dyestuffs can be produced in substance or on the fiber.

The dyestuffs obtained by our invention correspond to the general formula:

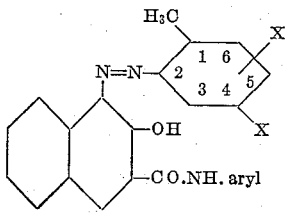

wherein both the X's stand for halogen but at least one of which must be a bromine atom and wherein the aryl residue may be substituted or not but must not contain any free sulfonic- or carboxylic groups.

The dyestuffs are insoluble in water and possess a good fastness to light.

The following examples illustrate our invention but they are not intended to limit it thereto, the parts being parts by weight:

1. 50 g. of well boiled cotton yarn are treated with the grounding liquor for half an hour, well freed from water by wringing it out or by centrifugating it and dyed for one minute in the diazo solution. The dyed yarn is then thoroughly rinsed, soaped at boiling temperature and again rinsed.

The grounding liquor is prepared as follows:

4.5 g. of 2.3-hydroxynaphthoic acid-2'.5'-dimethoxy-1'-anilide
9 cc. of sodium Turkey red oil of 50% strength
11.25 cc. of caustic soda solution of 34° Bé. are dissolved in boiling water; after cooling
4.5 cc. of formaldehyde of 30% strength are added and the whole is made up to
1 liter.

The developing bath is prepared as follows:

4.4 g. of 4-chloro-5-bromo-2-amino-1-toluene are made into a paste with
5.2 cc. of hydrochloric acid of 22° Bé. and a small quantity of water;
1.44 g. of dissolved sodium nitrite and some ice are gradually added. After the diazotization is complete, the solution is neutralized with
4 g. of sodium acetate and the whole is made up to
1 liter.

The dyeing has a very vivid, bluish-red shade, very fast to light. The dyestuff has the formula:

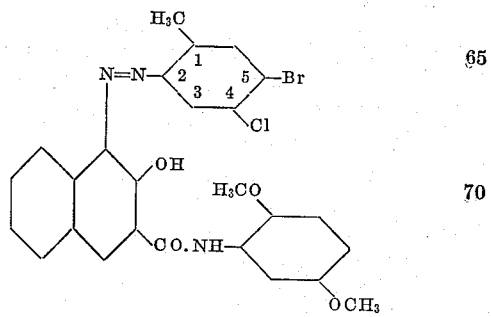

2. By substituting in the grounding liquor of the preceding example for the 2.3-hydroxynaphthoic acid-2'.5'-dimethoxy-1'-anilide the equimolecular quantity of 2.3-hydroxynaphthoic acid 2'- or 4'-anisidide, there is also obtained a vivid bluish red shade of very good fastness to light. By using an equimolecular quantity of 2.3-hydroxynaphthoic acid-5'-chloro-2'-anisidide (NH: OCH₃: Cl=2:1:5)

for preparing the grounding liquor, there is obtained a dull alizarine red of very good fastness to light.

3. The grounding liquor is prepared as follows:

4.5 g. of 2.3-hydroxynaphthoic acid-5'-chloro-2'-anisidide (NH: OCH₃: Cl=2:1:5)
9 cc. of sodium Turkey red oil of 50% strength and
11.25 cc. of caustic soda solution of 34° Bé. are dissolved in hot water and the solution is cooled;
4.5 cc. of formaldehyde of 30% strength are then added and the whole is made up to
1 liter.

The developing bath is prepared as follows:

5.3 g. of 4.5-dibromo-2-amino-1-toluene are made into a paste with a small quantity of water and
5.2 cc. of hydrochloric acid of 22° Bé.; some ice and
1.44 g. of dissolved sodium nitrite are added by portions. After the diazotization is complete, the solution is neutralized with
4 g. of sodium acetate and the whole is made up to
1 liter.

The dyeing has a bluish red shade. By preparing the grounding liquor with 2.3-hydroxynaphthoic acid 2'- or 4'-anisidide or 2.3-hydroxynaphthoic acid 2'.5'-dimethoxy-1'-anilide there are obtained vivid yellowish red shades.

4. 22 parts of 4 chloro-5-bromo-2-amino-1-toluene are diazotized in known manner with hydrochloric acid and sodium nitrite; the diazo solution thus obtained is introduced, while well stirring, into an aqueous suspension of 30 parts of 2.3-hydroxynaphthoic acid-4'-anisdide prepared by dissolving the latter in dilute caustic soda solution and reprecipitating with dilute acetic acid. The dyestuff precipitates in the form of vivid red flakes; it is filtered off after the coupling is complete, washed until neutral and advantageously used in a paste form. When dried, it is a bluish-red powder.

Similar shades and dyestuffs of very good fastness are obtained by using the diazo compounds of other bases having the general formula:

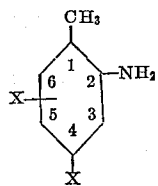

wherein both the X's stand for halogen, but at least one of which must be a bromine atom, and 2.3-hydroxynaphthoic acid-arylamides other than those indicated in the above named examples.

We claim:

1. As new products, the water-insoluble azo dyestuffs of the following formula:

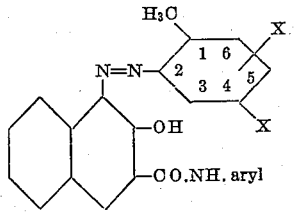

wherein both the X's stand for halogen, but at least one of which must be a bromine atom and wherein the aryl residue may be substituted or not, but is to contain no free sulfonic- or carboxylic groups, dyeing vivid red shades very fast to light.

2. As new products, the water-insoluble azo dyestuffs of the following formula:

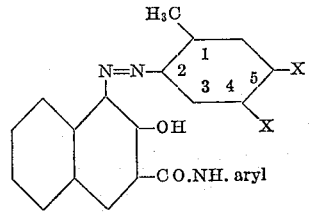

wherein both the X's stand for halogen, but at least one of which must be a bromine atom and wherein the aryl residue may be substituted or not, but is to contain no free sulfonic- or carboxylic groups, dyeing vivid red shades very fast to light.

3. As new products, the water-insoluble azo dyestuffs of the following formula:

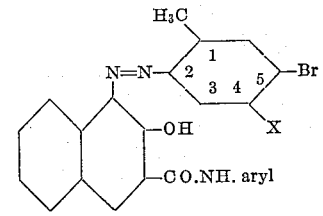

wherein X stands for Cl or Br and wherein the aryl residue may be substituted or not, but is to contain no free sulfonic or carboxylic groups, dyeing vivid red shades very fast to light.

4. As new products, the water-insoluble azo dyestuffs of the following formula:

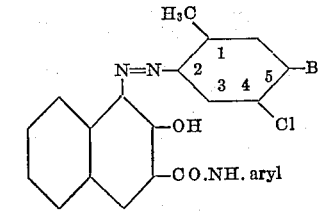

wherein the aryl residue may be substituted or not, but is to contain no free sulfonic- or carboxylic groups, dyeing vivid red shades very fast to light.

5. As new products, the water insoluble azo dyestuffs of the following formula:

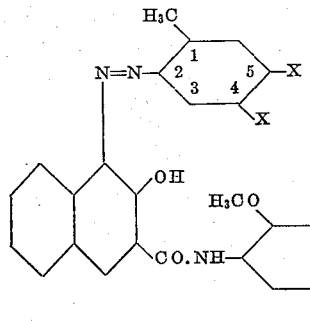

wherein both the X's stand for halogen, but at least one of which must be a bromine atom and wherein Y stands for hydrogen or the —OCH$_3$ group, dyeing vivid red shades very fast to light.

6. As new products, the water-insoluble azo dyestuffs of the following formula:

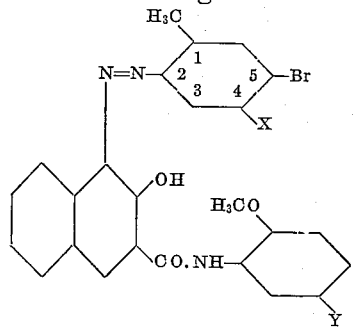

wherein X stands for Cl or Br and Y for hydrogen or the —OCH₃ group, dyeing vivid red shades very fast to light.

7. As new products, the water-insoluble azo dyestuffs of the following formula:

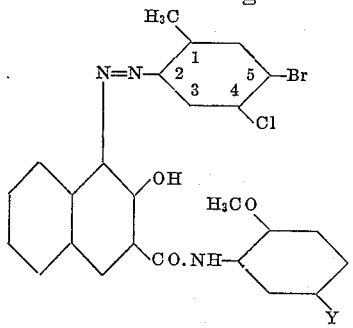

wherein Y stands for hydrogen or the —OCH₃ group, dyeing vivid red shades very fast to light.

8. As new products, the water-insoluble azo dyestuffs of the followings formula:

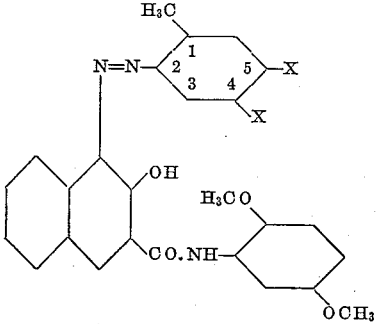

wherein both the X's stand for halogen, but at least one of which must be a bromine atom, dyeing vivid red shades very fast to light.

9. As new products, the water-insoluble azo dyestuffs of the following formula:

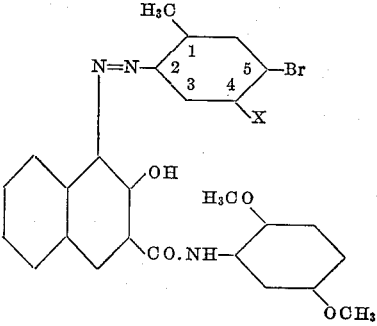

wherein X stands for Cl or Br, dyeing vivid red shades very fast to light.

10. As a new product, the water-insoluble azo dyestuff of the following formula:

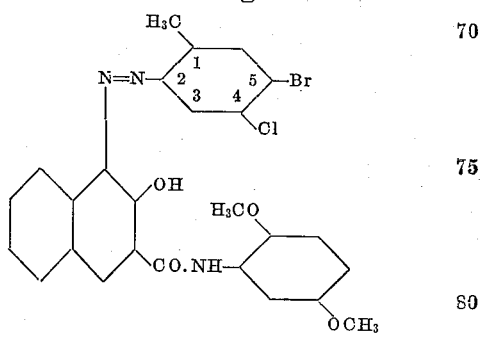

dyeing a vivid bluish-red shade very fast to light.

11. Material dyed with dyestuffs as claimed in claim 1.
12. Material dyed with dyestuffs as claimed in claim 2.
13. Material dyed with dyestuffs as claimed in claim 3.
14. Material dyed with dyestuffs as claimed in claim 4.
15. Material dyed with dyestuffs as claimed in claim 5.
16. Material dyed with dyestuffs as claimed in claim 6.
17. Material dyed with dyestuffs as claimed in claim 7.
18. Material dyed with dyestuffs as claimed in claim 8.
19. Material dyed with dyestuffs as claimed in claim 9.
20. Material dyed with the dyestuff as claimed in claim 10.

In testimony whereof, we affix our signatures.

RICHARD DERESER.
KARL MOLDAENKE.